Patented Nov. 20, 1934

1,981,557

UNITED STATES PATENT OFFICE 1,981,557

METHOD OF TREATING WHEAT

Walter W. Lehman, Council Bluffs, Iowa

No Drawing. Application February 20, 1932,
Serial No. 594,397

1 Claim. (Cl. 83—28)

The invention relates to improvements in a method of and means for treating wheat and particularly to an improved mixture and the application thereof to wheat for removing all smut and/or foreign odors from the wheat.

An object of the invention is to provide an improved dry mixture for removing all smut, smutty substances, foreign matter and foreign odors from wheat.

Another object is to provide an improved process for treating wheat which will not damage or otherwise injure, or cause injury to, said wheat.

Another object is to provide an improved method for treating with equally satisfactory results all grades and species of wheat.

Another object is to provide an improved inexpensive means for treating wheat to impart thereto all the essential and desirable characteristics of wheat in its natural state.

The foregoing and such other objects of the invention as will appear hereinafter will be more readily understood from a perusal of the following specification:

Known methods of treating wheat in the berry to remove smut, and other foreign substances contained in the fuzz thereon, and foreign odors are objectionable for the reasons that the wheat when so treated often breaks up and because of its tendency to become musty such wheat cannot be stored. The known methods very often leave the outer tissue or skin dry and brittle with the result that said tissue or skin peels off leaving an inferior product. The most commonly used known methods of treating wheat are by washing, liming or clipping.

Wheat treated by washing cannot be stored because of its tendency to heat which results in the berries becoming musty. Washed wheat also peels and obtains an objectionable odor making it easy to detect. Limed wheat must be specially treated in wheat washers which scour the berries and leave a coating of lime thereon. Such scouring breaks up the wheat berries and the presence of lime is very apparent upon inspection because of the lime odor which remains after removal of the lime. Another known method used to remove smut is by clipping the ends of the berries in an oat clipper. Such means, however, often breaks up the berries and the smut odor is not removed thereby.

The improved method and means for treating wheat effectively removes all smut, smutty substances and any other foreign matter adhering thereto, without breaking down the berries or causing the outer tissue or skin to dry and peel off. Foreign odors, objectionable in wheat, also are removed by the new process.

As hereinbefore indicated, the improved compound is applied to the wheat in a dry powder state and preferably is mixed therewith while said wheat is being discharged into a storage bin, by injecting or otherwise floating, with the wheat, a proportional quantity of the powder.

The powder thus used preferably comprises a compound of proportional quantities of "Knox" silt-loam, which contains a small quantity of lime; bicarbonate of soda, wheat straw, or what is commonly termed "wheat tailings", and alfalfa. The compound, upon being mixed with the wheat, adheres to the end of the berry and absorbs the oil or other moisture contained in the smut thereon. After such mixture the whole is left standing for such time, varying from 6 hours for hard wheat to 96 hours for soft wheat, as to allow the compound which has absorbed the smut oil to dry, after which time the compound which returns to a powdery state, is knocked off by running the wheat through any suitable agitating or beater machinery which may be adapted for that purpose. The absorption of the oil by the compound leaves the smut dry and it is easily knocked off with the compound.

Although the proportions of the various ingredients making up the improved compound may vary under certain conditions of use, without affecting the results obtained, it is preferable that they be proportioned substantially as follows: 80 per-cent "Knox" silt-loam, 1 per-cent bicarbonate of soda, 13 per-cent wheat straw and 6 per-cent alfalfa. In preparation, the silt-loam and the bicarbonate of soda (which neutralizes the lime in the silt-loam) are mixed with sufficient water or other suitable liquid to provide a thin batter. The batter is then heated to the boiling point and set off to cool preferably under ordinary temperatures. While cool the mixture, which becomes hard and dry, is ground or pulverized to a fine mesh. The wheat straw and alfalfa, which have previously been ground fine, are then mixed with the resulting combined powdered silt-loam and bicarbonate of soda, and the product is ready for use. The most satisfactory results have been obtained when one part of the compound is applied to 63 parts of wheat, however, this proportion also may vary to suit the requirements of various species of wheat without affecting the result.

One noticeable characteristic of the wheat after having been treated with the new compound is that it obtains the smooth velvety finish very apparent in wheat in its natural state, which result has been impossible to obtain under known methods. This smooth velvety finish results from the inclusion of the bicarbonate of soda. The inclusion of the ground alfalfa is to counteract and eliminate, by sweetening, the smutty or other foreign odors and the wheat straw or "wheat tailings" bleaches the wheat and returns its natural odor. Although the inclusion of bicarbonate of soda is highly desirable, it may be eliminated entirely, and in such instance the silt-loam is heated to a temperature of 180° F. prior to the addition of the remaining ingredients. Such heating removes any moisture which may be contained in the silt-loam and leaves it in a very dry highly pulverized condition.

It can thus be readily understood that treatment of wheat by the foregoing process results in a product having the essentials of untreated wheat which can be stored indefinitely without deterioration.

Although a specific mode of compounding has been set forth in the foregoing it is to be understood that the proportions of the ingredients, the method of mixing and treating the various ingredients, and the method of application of the compound may vary to suit various conditions without departing from the spirit of the invention or the scope of the appended claim.

I claim:

The method of removing smut from wheat being prepared for milling purposes, which consists of the application to said wheat of a dry mixture of powdered silt-loam, bicarbonate of soda, wheat straw, and alfalfa, allowing said mixture to absorb the moisture in said smut and dry on said wheat, and the removal of said dry mixture and dry smut therefrom.

WALTER W. LEHMAN.